Patented Jan. 13, 1931

1,788,555

UNITED STATES PATENT OFFICE

ROBERT B. WOLF, OF NEW YORK, N. Y., AND RAYMOND P. HILL, OF GLEN ROCK, AND RAYMOND S. HATCH, OF EAST ORANGE, NEW JERSEY

METHOD OF PREPARING CELLULOSE PULP

No Drawing.    Application filed February 8, 1929. Serial No. 338,610.

This invention relates to the preparation of cellulose pulp and particularly to an improved method of treating wood and other ligno-cellulose material to separate and recover the constituents.

In the usual procedures for the recovery of cellulose, wood, for example, is reduced to the form of chips which are charged into a closed digester with a suitable liquor containing a chemical which will react with the ligneous portion of the wood. The digester is closed and the mass is heated directly or indirectly with steam or otherwise until the reaction is completed. The heating may continue for a period of from seven to thirty-six hours, more or less depending upon the character and concentration of the chemical, the temperature employed, etc. At the conclusion of the treatment the ligneous portion of the wood is modified and dissolved, leaving substantially pure cellulose.

The acid liquor used in the sulphite process is an aqueous solution including bases such as calcium, magnesium, sodium, ammonium or mixtures thereof, which has been subjected to gaseous sulphur dioxide and consists of the sulphite, bisulphite or mixtures of these compounds of the bases mentioned. The total sulphur dioxide content of such acid liquor will vary from one and one-half to six per cent approximately.

The acid liquor containing sulphites, bisulphites or both reacts with the ligneous portion of the wood to produce a complex lignin sulphonic acid compound which may be partly or wholly combined with the bases present in the acid liquor. The resulting compounds are highly ionized, that is, they belong to the class of so-called strong acids.

Cellulose is easily altered by acid hydrolysis in the presence of dilute strong acid at elevated temperature. There is, consequently, a considerable loss of cellulose in the sulphite process which cannot be avoided under the normal conditions of operation.

Moreover, the lignin sulphonic acid compounds produced by the reaction are partly polymerized at the high temperature. The resulting resinous products are of little value in the arts. It is impracticable to separate simple sulphonic acid derivatives from the acid liquor. Consequently the cellulose recovered is the only valuable product of the sulphite process.

It is the object of the invention to avoid the difficulties hereinbefore mentioned and particularly the losses incident to the treatment of cellulose material with strong acids in the presence of an excess of water at high temperature.

A further object of the invention is the provision of a method of treating wood and like material to recover cellulose and other products without degradation or substantial loss.

Another object of the invention is to effect a considerable saving in the amount of sulphur consumed per ton of cellulose produced.

The method depends upon the application of anhydrous liquid sulphur dioxide or solutions thereof in non-aqueous solvents to the cellulose material. Sulphur dioxide is liquid at ordinary atmospheric temperature under a pressure of approximately 100 pounds per square inch. It can be prepared and utilized, therefore, as a liquid at that pressure. It is soluble in non-aqueous solvents such as glycerine, ethyl alcohol, chlorine componds of acetylene and other organic solvents and can be utilized for the purpose of the invention in such solutions.

To effect the conversion of ligneous compounds in wood into lignin sulphonic acid a certain proportion of water is required. Water is, however, present in the wood in sufficient proportion to ensure the completion of the reaction. Extraneous water is not required, therefore, and as hereinbefore indicated it is detrimental inasmuch as the presence of surplus water induces the degradation of the cellulose.

We have discovered that wood and similar cellulose material can be effectively treated with anhydrous liquid sulphur dioxide or non-aqueous solutions thereof to separate the cellulose therefrom. The cellulose is recovered in a substantially pure condition. The lignin sulphonic acid is substantially unpolymerized and can be separated readily. It can be utilized for various purposes.

Furthermore the procedure avoids substantial losses of sulphur dioxide which are incident to the sulphite process as heretofore practised. The amount of sulphur consumed per ton of pulp recovered is, therefore, reduced materially.

In carrying out the invention, we prefer to employ anhydrous liquid sulphur dioxide. The liquid can be prepared in the usual manner by burning sulphur, purifying the gas, and compressing it to the required pressure to effect liquefaction at normal atmospheric temperature.

The wood or other material is prepared, for example, in the form of chips and is charged into a digester of the usual form. Such digesters are capable of withstanding pressures in excess of those required for the method. Anhydrous liquid sulphur dioxide is introduced to the digester and the mixture is subjected to a pressure of approximately one hundred and twenty-five pounds per square inch at ordinary atmospheric or slightly elevated temperature, for example 60° to 100° F. The pressure and temperature can be varied considerably, it being necessary merely to maintain the sulphur dioxide in liquid form.

The low surface tension of the liquid sulphur dioxide facilitates the penetration of the wood. The pressure likewise aids the penetration. The sulphur dioxide in the presence of water contained in the wood readily reacts with the ligneous material, converting it into relatively simple lignin sulphonic acid compounds. When the reaction is complete, or after a period varying from two to eight hours, the liquid sulphur dioxide is withdrawn under pressure to avoid vaporizing it. The residue of sulphur dioxide is separated readily from the wood by the introduction of steam, air or an inert gas, and the sulphur dioxide is recovered for further use after reliquefaction.

The material in the digester, including the cellulose and the lignin sulphonic acid compounds, is then treated with water or a solution of the bases including alkali or alkaline earth metals to dissolve the lignin sulphonic acid compounds which may be recovered by evaporation or otherwise. The cellulose remains undissolved and after suitable washing to remove residual impurities it can be utilized for any of the purposes for which it is adapted.

It will be noted that the temperature employed in digesting the material is very low as compared with temperatures employed in the sulphite process. Hence there is no tendency to degrade the cellulose or to polymerize the lignin compounds. Losses from these sources are avoided, and the yield of cellulose is correspondingly higher. There is likewise no loss of sulphur in the form of inorganic sulphates or in gas which is discharged to the atmosphere, and the complicated recovery system which is usually used to recover sulphur dioxide in the sulphite process is not required. The liquid sulphur dioxide, being continually under pressure, cannot escape and is easily stored and returned for further use.

Instead of using liquid sulphur dioxide we may employ non-aqueous solutions of sulphur dioxide in solvents such as glycerine, alcohol, etc. The method is substantially the same. The chips are subjected in the digester to the solution at approximately the temperature and pressure hereinbefore mentioned. The reaction is effected in the presence of water which is in the wood so that no extraneous water is introduced. When the reaction is completed the solution of sulphur dioxide is withdrawn and the wood is then washed with water or alkaline solutions to separate the lignin sulphonic acid leaving the cellulose which, after final washing, can be used as desired. The lignin sulphonic acid which is not polymerized can also be recovered by evaporation of the solution and utilized for commercial purposes.

The method as described presents numerous advantages with respect to the yield and quality of the products obtained and the saving effected. These and other advantages may be secured with various modifications of the procedure described.

We claim:

1. The method of preparing cellulose pulp from ligno-cellulose material which comprises converting the ligneous portion thereof into soluble compounds by subjecting ligno-cellulose material to the action of a non-aqueous liquid containing sulphur dioxide.

2. The method of preparing cellulose pulp from ligno-cellulose material which comprises converting the ligneous portion thereof into soluble compounds by subjecting ligno-cellulose material to the action of a non-aqueous liquid containing sulphur dioxide, withdrawing the liquid and washing the converted ligneous material from the cellulose.

3. The method of preparing cellulose pulp from ligno-cellulose material which comprises converting the ligneous portion thereof into soluble compounds by subjecting ligno-cellulose material to the action of a non-aqueous liquid containing sulphur dioxide at approximately ordinary atmospheric temperature.

4. The method of preparing cellulose pulp from ligno-cellulose material which comprises converting the ligneous portion thereof into soluble compounds by subjecting ligno-cellulose material to the action of a non-aqueous liquid containing sulphur dioxide at approximately ordinary atmospheric temperature, withdrawing the liquid, and washing the converted ligneous material from the cellulose.

5. The method of preparing cellulose pulp from ligno-cellulose material which comprises converting the ligneous portion thereof into soluble compounds by subjecting ligno-cellulose material to the action of anhydrous liquid sulphur dioxide.

6. The method of preparing cellulose pulp from ligno-cellulose material which comprises converting the ligneous portion thereof into soluble compounds by subjecting ligno-cellulose material to the action of anhydrous liquid sulphur dioxide, withdrawing the liquid, and washing the converted ligneous material from the cellulose.

7. The method of preparing cellulose pulp from ligno-cellulose material which comprises converting the ligneous portion thereof into soluble compounds by subjecting ligno-cellulose material to the action of anhydrous liquid sulphur dioxide, withdrawing the liquid, removing the residual sulphur dioxide and washing the converted ligneous material from the cellulose.

8. The method of preparing cellulose pulp from ligno-cellulose material which comprises converting the ligneous portion thereof into soluble compounds by subjecting ligno-cellulose material to the action of anhydrous liquid sulphur dioxide at substantially ordinary atmospheric temperature.

9. The method of preparing cellulose pulp from ligno-cellulose material which comprises converting the ligneous portion thereof into soluble compounds by subjecting ligno-cellulose material to the action of anhydrous liquid sulphur dioxide at substantially ordinary atmospheric temperature, withdrawing the liquid, and washing the converted ligneous material from the cellulose.

10. The method of preparing cellulose pulp from ligno-cellulose material which comprises converting the ligneous portion thereof into soluble compounds by subjecting ligno-cellulose material to the action of anhydrous liquid sulphur dioxide at substantially ordinary atmospheric temperature, withdrawing the liquid under pressure sufficient to prevent evaporation thereof, and washing the converted ligneous material from the cellulose.

In testimony whereof we affix our signatures.

ROBERT B. WOLF.
RAYMOND P. HILL.
RAYMOND S. HATCH.